United States Patent
Tanaka (10) Patent No.: US 12,445,424 B2
(45) Date of Patent: Oct. 14, 2025

(54) COMMUNICATION DEVICE, COMMUNICATION METHOD, AND COMPUTER PROGRAM PRODUCT

(71) Applicant: KABUSHIKI KAISHA TOSHIBA, Tokyo (JP)

(72) Inventor: Yasuyuki Tanaka, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 214 days.

(21) Appl. No.: 18/449,208

(22) Filed: Aug. 14, 2023

(65) Prior Publication Data
US 2024/0250939 A1    Jul. 25, 2024

(30) Foreign Application Priority Data
Jan. 23, 2023  (JP) ................... 2023-008281

(51) Int. Cl.
*H04L 9/40* (2022.01)
*H04L 69/40* (2022.01)

(52) U.S. Cl.
CPC .............. *H04L 63/08* (2013.01); *H04L 63/10* (2013.01); *H04L 69/40* (2013.01)

(58) Field of Classification Search
CPC .......... H04L 63/08; H04L 63/10; H04L 69/40
See application file for complete search history.

(56) References Cited

U.S. PATENT DOCUMENTS

| | | | |
|---|---|---|---|
| 2015/0222557 A1* | 8/2015 | Bhattacharya | H04L 47/32 370/237 |
| 2015/0227732 A1* | 8/2015 | Doctor | G06F 21/31 726/4 |

FOREIGN PATENT DOCUMENTS

| | | |
|---|---|---|
| JP | 2003-15829 A | 1/2003 |
| JP | 2004-295656 A | 10/2004 |
| JP | 2008-502075 A | 1/2008 |
| JP | 6821765 B2 | 1/2021 |

OTHER PUBLICATIONS

AWS IoT Device Shadow service, https://docs.aws.amazon.com/iot/lastest/developerguide/iot-device-shadows.html, 3 pages.
Japanese Office Action issued Aug. 5, 2025, in Japanese Patent Application No. 2023-008281 (with unedited computer-generated English translation), citing documents 15-17, 8 pages.

* cited by examiner

*Primary Examiner* — El Hadj M Sall
(74) *Attorney, Agent, or Firm* — Oblon, McClelland, Maier &Neustadt, L.L.P.

(57) ABSTRACT

A communication device includes a storage, and one or more hardware processors. The storage stores, for each of a plurality of servers, setting information including identification information of the server, authentication information used for connecting to the server, permission information indicating permitted communication with the server, and a priority. The hardware processors select, based on the priority, a first server that is one of the servers. The hardware processors perform, according to the permission information for the first server, communication with the first server that is connected based on the identification information and the authentication information.

12 Claims, 11 Drawing Sheets

| PRIORITY | LINK DESTINATION IDENTIFICATION INFORMATION | SERVER CERTIFICATE | EDGE AUTHENTICATION INFORMATION | PERMISSION INFORMATION | SWITCHING CONDITION |
|---|---|---|---|---|---|
| 1 | CLOUD PLATFORM 201 | CERTIFICATE C01 | KEY PAIR P01 | TRANSMIT ALL DATA RECEIVE ALL DATA | ERROR CONTINUES FOR 2 MIN OR OCCURRENCE OF 5 CONSECUTIVE ERRORS |
| 2 | CLOUD PLATFORM 202 | CERTIFICATE C02 | KEY PAIR P02 | TRANSMIT STATE MONITORING DATA RECEIVE CLOUD SWITCHING INSTRUCTION | |

| PRIORITY | LINK DESTINATION IDENTIFICATION INFORMATION | SERVER CERTIFICATE | EDGE AUTHENTICATION INFORMATION | PERMISSION INFORMATION | SWITCHING CONDITION |
|---|---|---|---|---|---|
| 1 | CLOUD PLATFORM 201 | CERTIFICATE C01 | KEY PAIR P01 | TRANSMIT ALL DATA RECEIVE ALL DATA | ERROR CONTINUES FOR 2 MIN OR OCCURRENCE OF 5 CONSECUTIVE ERRORS |
| 2 | CLOUD PLATFORM 202 | CERTIFICATE C02 | KEY PAIR P02 | TRANSMIT ALL DATA RECEIVE CLOUD SWITCHING INSTRUCTION | ERROR CONTINUES FOR 1 MIN OR OCCURRENCE OF 3 CONSECUTIVE ERRORS |
| 3 | ON-PREMISE SERVER | CERTIFICATE C03 | EDGE ID, PASSWORD | TRANSMIT STATE MONITORING DATA RECEIVE CLOUD SWITCHING INSTRUCTION | ERROR CONTINUES FOR 2 MIN OR DETECT OFFLINE |
| 4 | LOCAL (AUTONOMOUS OPERATION) | NONE | NONE | DISPLAY STATE MONITORING DATA ACCEPT CLOUD SWITCHING INSTRUCTION | |

FIG.12

COMMUNICATION DEVICE, COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2023-008281, filed on Jan. 23, 2023; the entire contents of which are incorporated herein by reference.

FIELD

Embodiments described herein generally relate to a communication device, a communication method, and a computer program product.

BACKGROUND

There is a known communication system that implements various kinds of processing using a server such as a cloud platform. For example, there is a communication system in which an application running on a server acquires the state of one or more edge terminals (clients) connected to the server, and implements a service using the acquired state.

The server may have a failure (abnormality) caused due to some reason, and become unable to communicate with the edge terminals. Even in the event of such a failure, it is desirable for the service requested by the edge terminals to be continuously executed without being interrupted as much as possible.

DETAILED DESCRIPTION

According to an embodiment, a communication device includes a storage and one or more hardware processors communicably coupled to the storage. The storage stores therein, for each of a plurality of servers, setting information including identification information of a server, authentication information used for connecting to the server, permission information indicating permitted communication with the server, and a priority. The hardware processors select, based on the priority, a first server that is one of the servers. The hardware processors perform, according to the permission information for the first server, communication with the first server that is connected based on the identification information and the authentication information. Hereinafter, exemplary embodiments of a communication device according to the present application will be described in detail with reference to the accompanying drawings.

There is a service known to enable an application on a server to acquire the state of an edge terminal even in a situation where the edge terminal cannot connect to the server. However, the state of the edge terminal provided to the application by such a service is the last state that is acquired when the edge terminal is able to communicate with the server. Thus, there is no guarantee that the last state reflects the current state of being not connectable to the server. Therefore, it is desired to enable checking the state of the edge terminal or controlling the edge terminal even when communication with the server is not enabled.

First Embodiment

A communication device according to a first embodiment switches the server as a link destination in accordance with the communication status. This makes it possible to suppress outage of the services using the servers.

Note that the communication system according to the present embodiment is different from a communication system with redundant servers, for example. In a communication system with redundant servers, for example, server identification information (uniform resource locator (URL), or the like) and authentication information (certificate, key information, or the like) used to connect to the servers are not changed. In other words, even when a failure occurs in any one of a plurality of redundant servers, the edge terminal can continuously use the services provided by the servers without being aware of the failure.

In contrast, in the present embodiment, mutually different identification information and authentication information are used for each of the servers to be the link destinations. The edge terminal detects whether there is a failure in communication with the linked server among the servers and, when a failure is detected, switches the link destination to another server using the identification information and the authentication information. Note that the use of different identification information and authentication information, for example, makes it possible to suppress unauthorized accesses more compared to a configuration that uses common identification information and authentication information.

First, the outline of functions of the communication system according to the present embodiment will be described. The communication system includes an edge terminal and a plurality of cloud platforms. The edge terminal is an example of a client (communication device). A cloud platform is an example of a server, and represents a server (platform) built on a cloud environment, for example.

For each of the cloud platforms, the edge terminal manages the identification information of the cloud platform and the authentication information used to connect to the cloud platform. The edge terminal also manages the priority of each cloud platform and permission information indicating data permitted to be communicated with each cloud platform as well as control content.

Under a normal state, the edge terminal connects to the cloud platform with high priority (for example, highest priority) and executes an application according to the permission information with that cloud platform. When a failure is detected in the communication with the cloud platform, the edge terminal switches the connection to a cloud platform with the next highest priority. A failure in communication is a case where communication fails for a certain period of time or a certain number of times, for example. When a failure is also detected in the communication with the cloud platform with the next highest priority, the edge terminal may attempt to connect to the cloud platform with the highest priority or to the cloud platform with the second next highest priority.

As described above, in the present embodiment, the edge terminal executes the application not only with one cloud platform, but also with a plurality of cloud platforms. Note that the edge terminal may regularly notify the current operation status of the edge terminal to the cloud platforms other than the currently connected cloud platform. The edge terminal may also allow the currently connected cloud platform to perform switching control of the cloud platform on which the application is executed.

Figure 1:
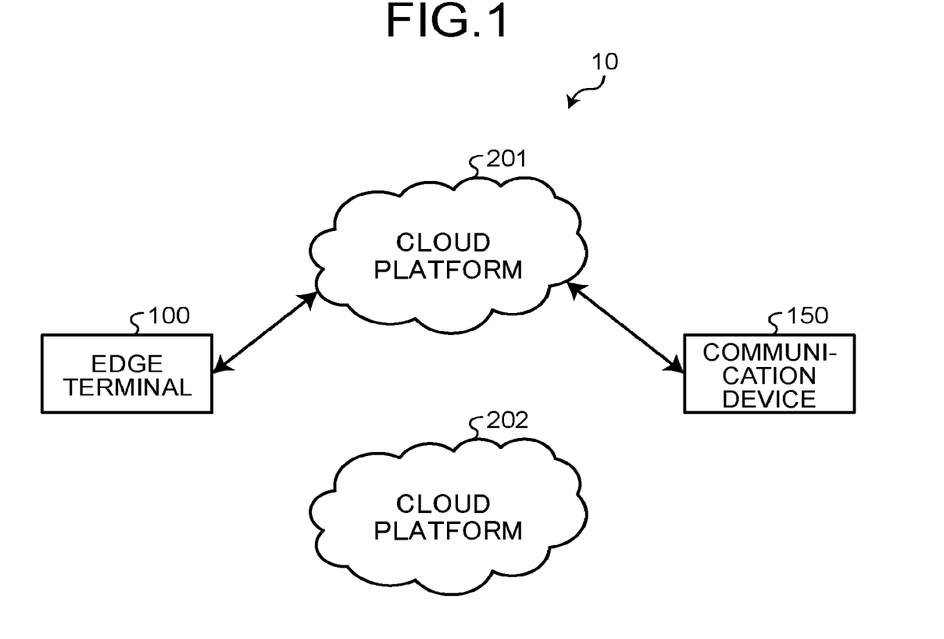
FIG. 1 is a block diagram illustrating a communication system according to a first embodiment.

Next, the details of the communication system according to the present embodiment will be described. FIG. 1 is a diagram illustrating a configuration example of a communication system 10 according to the present embodiment.

As illustrated in FIG. 1, the communication system 10 includes an edge terminal 100, a communication device 150, and cloud platforms 201, 202. The communication system 10 may also include a plurality of edge terminals 100 and three or more cloud platforms. Hereinafter, a case of having two cloud platforms 201, 202 and switching those cloud platforms will mainly be described.

The edge terminal 100 operates in conjunction with the cloud platform 201 or the cloud platform 202. The network between the edge terminal 100 and the cloud platforms 201, 202, and the network between the communication device 150 and the cloud platforms 201, 202 may be a network of any configuration, such as a local area network (LAN) and a wide area network (WAN). Typically, the edge terminal 100 and the communication device 150 are connected to the Internet, and work in conjunction with the cloud platforms 201, 202 connected to the Internet.

The communication mode used by the edge terminal 100 and the communication device 150 to connect to the Internet may be a wired connection communication mode such as ETERNET® (registered trademark), or may be a wireless connection communication mode such as a connection via a mobile phone network and a wireless LAN connection. As described above, the network configuration between the edge terminal 100, the communication device 150, and the cloud platforms 201, 202 as well as the specific communication mode of the network may be any network configuration and communication mode.

FIG. 1 illustrates an example where the cloud platform 201 operates in conjunction with the edge terminal 100 as the cloud platform executing the main application. The application may be any application, and an example thereof may be an application as follows.

Example of application: The edge terminal 100 transmits data of detected temperatures to the cloud platform. The cloud platform transmits a command or an instruction to the edge terminal 100 to control air conditioning, blind, lighting, and the like according to the temperature.

As described above, for example, the edge terminal 100 transmits data collected by the edge terminal 100 to the cloud platform 201 (application), and executes processing on the edge terminal 100 according to the instruction from the cloud platform 201 (application). The data (data to be collected) that the edge terminal 100 transmits to the cloud platform 201 is, for example, reading values (sensor data) of the sensor provided to the edge terminal 100 as well as statistic values of the operation status of the system, such as central processing unit (CPU) utilization and memory usage of the edge terminal 100.

Instructions from the cloud platform 201 to the edge terminal 100 are, for example, an instruction to execute a single command, an instruction for batch processing including a series of commands, and an instruction including a certain amount of data transfer such as firmware update. The execution of the command and the execution timings of the firmware update may be instructed to the edge terminal 100 from the cloud platform 201, like a scheduled execution.

The cloud platform 201 may have a function (user interface function) to provide a user interface, such as a display screen for data collected from the edge terminal 100 and an operation screen for giving instructions to the edge terminal 100.

The communication device 150 is used to display such a user interface. The communication device 150 may be any device, and examples thereof may be mobile terminals such as a personal computer and a smartphone. For example, a user uses the user interface provided on the communication device 150 by the cloud platform 201 to grasp the status of the edge terminal 100 and to perform remote control of the site where the edge terminal 100 is placed.

Instead of the user interface function or together with the user interface function, the cloud platform 201 may have an external-linkage interface function. The external-linkage interface function may be, for example, an application programming interface (API) that provides data collected from the edge terminal 100, and an API that implements instructions to the edge terminal 100. Programs and services used by the user (programs and services running on the communication device 150) can operate the cloud platform 201 and the edge terminal 100 using the external-linkage interface. When the cloud platform 201 is not provided with the user interface function and the external-linkage interface function, the communication system 10 need not include the communication device 150.

Figure 2:
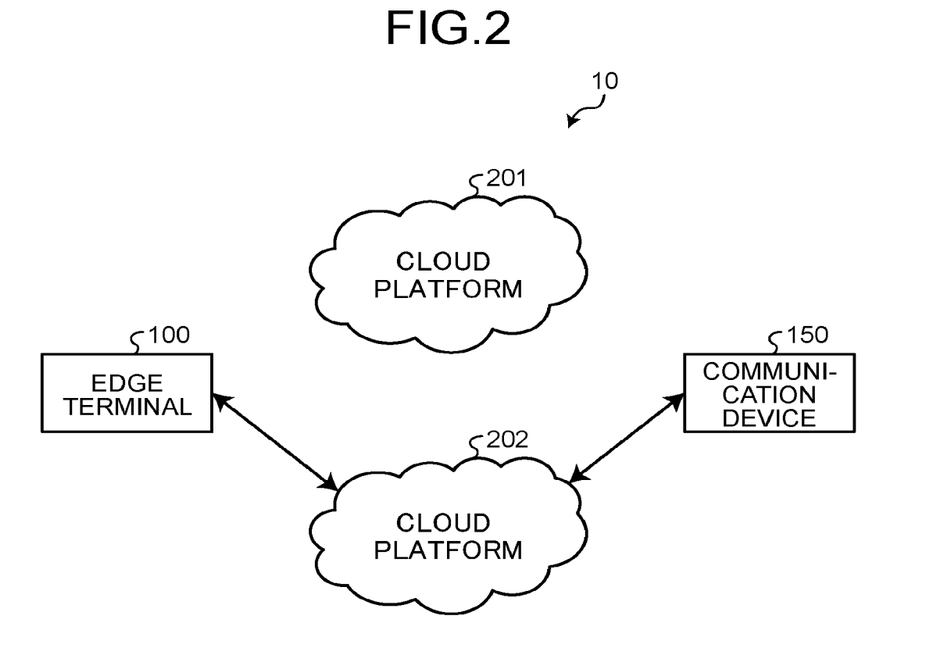
FIG. 2 is a diagram illustrating a configuration example of the communication system.

When communication between the edge terminal 100 and the cloud platform 201 is no longer possible, the edge terminal 100 switches the link destination to the cloud platform 202. FIG. 2 is a diagram illustrating a configuration example of the communication system 10 after the edge terminal 100 switches the link destination to the cloud platform 202.

There may be various reasons for causing communication failures between the edge terminal 100 and the cloud platform 201, and examples thereof may be as follows.

Failure in the communication mode used by the edge terminal 100 or in the network connected by the communication mode.

Failure in the external network to which the cloud platform 201 is connected.

Failure in the network between the edge terminal 100 and the cloud platform 201.

Failure in the cloud platform 201 itself.

Upon detecting a communication failure with the linked cloud platform 201, the edge terminal 100 switches the link destination to the cloud platform 202.

Like the cloud platform 201, the cloud platform 202 has functions to collect data from the edge terminal 100 and to output instructions to the edge terminal 100. The cloud platform 202 may also have the user interface function and the external-linkage interface function, like the cloud platform 201. Note, however, that the cloud platform 202 does not need to provide exactly the same functions as those of the cloud platform 201. In other words, there may be a difference between the functions implemented by the cloud platform 201 and the functions implemented by the cloud platform 202.

The cloud platform 202 has the lower priority than that of the cloud platform 201, and it is connected when there is a failure in the cloud platform 201. Thus, the cloud platform 202 may be a server that provides more limited functions than those of the cloud platform 201.

The edge terminal 100 can distinguish between the cloud platform 201 and the cloud platform 202 as the link destination. Typically, the edge terminal 100 distinguishes the link destinations by identification information such as URLs. The information used for distinction is not limited to URLs, but may also be information as follows.

Address information used for communication, such as internet protocol (IP) address Information of key used for security, such as fingerprint of public key Name of the application program running on each cloud platform, or the name and version information of the application program In any case, the edge terminal 100 can switch the link destination between the cloud platform 201 and the cloud platform 202 at its own discretion.

Figure 3:
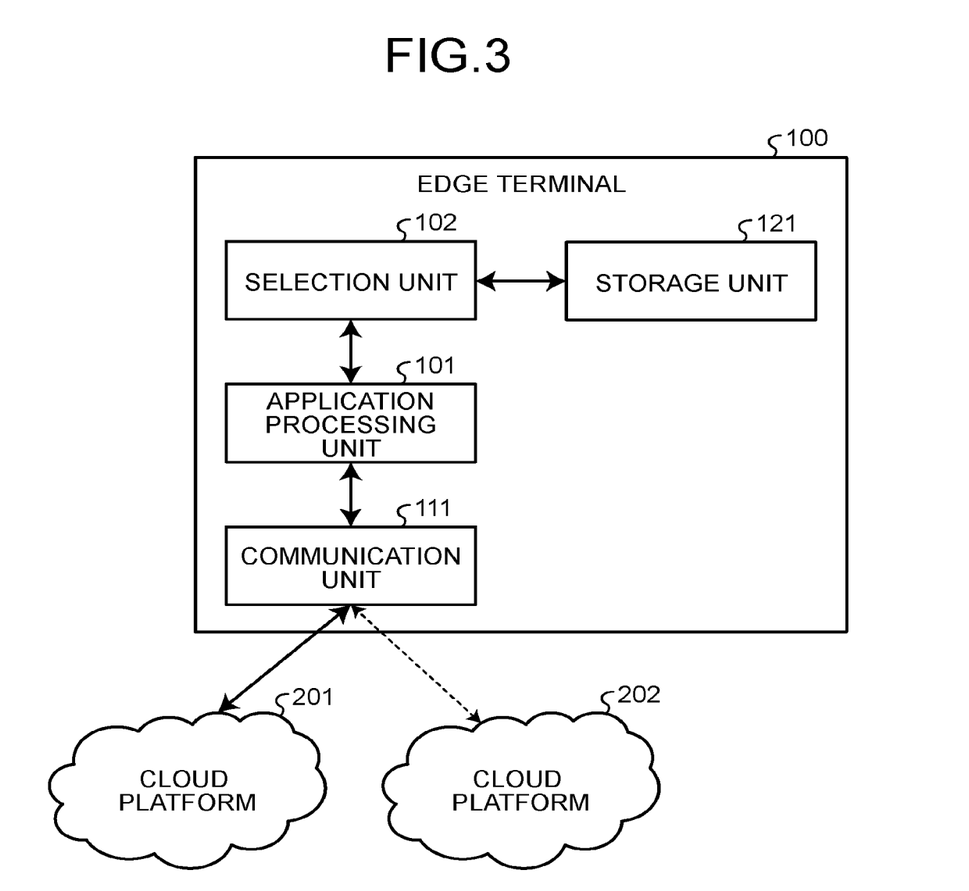
FIG. 3 is a block diagram of an edge terminal according to the first embodiment.

FIG. 3 is a block diagram illustrating an example of the configuration of the edge terminal 100. The edge terminal 100 includes a communication unit 111, an application processing unit 101, a selection unit 102, and a storage unit 121.

The communication unit 111 connects to the network, and communicates with the cloud platform 201 and the cloud platform 202 via the network. The communication mode of the communication unit 111 may be a wired connection, a wireless connection, or a combination of wired and wireless connection. The communication unit 111 also executes the communication processing including control for maintaining the connection to the network.

The application processing unit 101 executes application processing that is to be executed on the edge terminal 100 side in order to implement the services provided by the cloud platforms 201 and 202. For example, the application processing unit 101 performs acquisition or generation of data to be transmitted to the cloud platforms 201 and 202, and processing of the data.

In addition, the application processing unit 101 analyzes the instructions received from the cloud platforms 201 and 202, and executes processing according to the instructions. For example, when the edge terminal 100 includes one or more sensors (temperature sensor and the like) and transmits data (sensor data or the like indicating temperature) read out from the sensors to the cloud platforms 201 and 202, the application processing unit 101 may perform the sensor reading processing.

Furthermore, when the edge terminal 100 has one or more actuators and operates the actuators according to the instructions from the cloud platform 201 and 202, the application processing unit 101 may perform control of the actuators according to the instructions.

Furthermore, the application processing unit 101 detects a communication failure occurring with the currently linked cloud platform, and notifies the selection unit 102. While any method may be used as a failure detection method, it is possible to apply following methods, for example.

(M1) The application processing unit 101 detects a failure by communication failure information acquired from the communication unit 111. For example, if an error occurs when the communication unit 111 executes the name resolution processing for a host name contained in the URL that is the identification information of the cloud platform 201, the communication unit 111 notifies the application processing unit 101 that an error has occurred. The application processing unit 101 notifies the selection unit 102 of the notified occurrence of error.

(M2) If an error occurs when executing transmission processing of the sensor data for the cloud platform 201, the application processing unit 101 notifies the selection unit 102 of the occurrence of error.

(M3) When an instruction is expected to be transmitted from the cloud platform 201 to the edge terminal 100 at regular intervals and no instruction is received by the edge terminal 100 beyond the intervals, the application processing unit 101 determines that an error has occurred and notifies the selection unit 102 of the occurrence of error.

Errors to be notified are not limited to errors related to the currently linked cloud platform. For example, even in a state of being linked to the cloud platform 201, if the communication unit 111 or the application processing unit 101 communicates with the cloud platform 202 for the purpose of alive monitoring or the like and an error occurs in that communication, the selection unit 102 may be notified of the occurrence of error.

The selection unit 102 selects one platform (first server) from a plurality of cloud platforms based on the priority. For example, the selection unit 102 selects the cloud platform with the highest priority (for example, the cloud platform 201) during a normal state (when no failure is occurring). When a failure is detected in the communication with the connected cloud platform 201, the selection unit 102 selects the next highest priority cloud platform 202 as the link destination.

For example, upon receiving a notification of an error occurring in the application processing unit 101 or the communication unit 111, the selection unit 102 determines to switch the cloud platform as the link destination. The selection unit 102 refers to the setting information stored in the storage unit 121 to determine switching of the cloud platform.

The storage unit 121 stores therein various kinds of information used in the edge terminal 100. The storage unit 121 may be configured with various storage media used in general, such as a flash memory, a memory card, a random access memory (RAM), a hard disk drive (HDD), and an optical disc.

Figure 4:
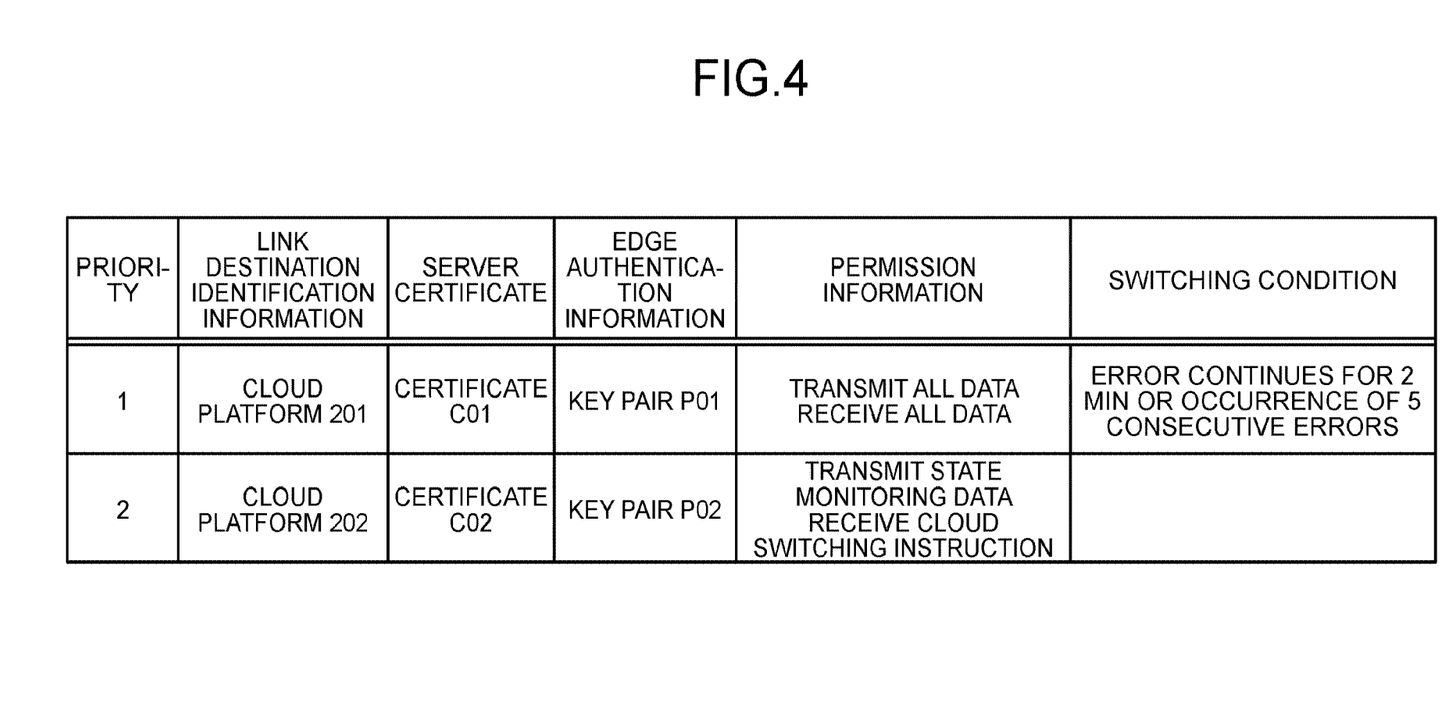
FIG. 4 is a chart illustrating an example of a data structure of setting information.

For example, the storage unit 121 stores setting information for each of the cloud platforms. FIG. 4 is a chart illustrating an example of a data structure of setting information. The setting information includes the priority, link destination identification information, server certificate, edge authentication information, permission information, and switching condition.

The link destination identification information is the identification information of the server (cloud platform) that can be the link destination. The server certificate is, for example, a certificate set for each of the cloud platforms. The edge authentication information is, for example, a key pair of the edge terminal 100 that is used when the edge terminal 100 communicates with each of the cloud platforms. The server certificate and the edge authentication information are examples of authentication information used when connecting to the cloud platforms.

As described above, the permission information is information that indicates data permitted to communicate with each of the cloud platforms and control content. In other words, the permission information includes information indicating, for each of the cloud platforms, the type of data that is permitted to be exchanged when linked. FIG. 4 illustrates an example of the permission information indicating that transmission of all data and reception of all data (reception of instruction, and the like) are permitted with the cloud platform 201 whose priority is 1 (high priority), and transmission of part of data and reception of part of data are only permitted with the cloud platform 202 whose priority is 2 (low priority).

The setting information including the priority is stored in the storage unit 121 in advance. The setting information may be factory-embedded as the initial setting for the edge terminal 100, or it may be set by the user directly to the edge terminal 100. Furthermore, by the initial setting or the like, the setting information in the storage unit 121 may be updated according to the instruction from the cloud platform to which the edge terminal 100 is currently linked.

While the priority may be determined in any way, it may be determined, for example, by the user or the administrator of the entire system. For example, the priority may be determined according to the number of functions supported by the application systems built on each of the cloud platforms. The priority may be determined by the amount of computational resources or communication resources that can be used on each of the cloud platforms. The priority may be determined according to the physical or logical distances between the edge terminal 100 and the cloud platforms.

The switching conditions are referred to when the selection unit 102 determines whether to switch the cloud platform as the link destination. Switching conditions can also be interpreted as conditions for detecting failures in the communication with the cloud platforms. For example, the selection unit 102 determines that a failure is detected in the communication with the connected cloud platform when the switching condition included in the setting information for the connected cloud platform is satisfied. The selection unit 102 then selects, as the cloud platform to be linked, a cloud platform (second server) other than the currently connected cloud platform. There may be a single or a plurality of switching conditions, and such conditions need not be set for some of the link destinations.

In the example in FIG. 4, when the switching condition set for the cloud platform 201 is satisfied, the selection unit 102 switches the link destination from the cloud platform 201 to the cloud platform 202. Furthermore, since no switching condition is set for the cloud platform 202, the selection unit 102 does not switch the cloud platform 202 to the cloud platform 201.

In such a case, switching from the cloud platform 202 to the cloud platform 201 may be performed, for example, by transmitting a switching instruction from the cloud platform 202 to the edge terminal 100. In other words, the edge terminal 100 corresponds not only to switching between the cloud platforms, but also to switching by the user instruction (manual switching). Note that switching may be performed from the cloud platform with a low priority to the cloud platform with a high priority.

For example, upon confirming that the cloud platform 201 that is linked before switching has recovered from a failure based on information on a website and a social networking service (SNS), or the like, the user gives an instruction via the cloud platform 202 that is linked after the switching to switch the link destination to the cloud platform 201 that is linked before the switching. Upon receiving a switching instruction, the selection unit 102 selects the cloud platform 201 as the link destination according to the instruction.

When the cloud platform as the link destination is switched, the selection unit 102 notifies the application processing unit 101 of the information indicating the cloud platform that is the link destination after the switching. The information to be notified includes, for example, the identification information of the cloud platform as the link destination, authentication information necessary for the linkage, and permission information.

However, as the method of implementing the application processing unit 101, sub-application programs to be executed may vary for each of the cloud platforms as the link destination, and containers to be executed may vary for each of the cloud platforms as the link destination. Therefore, the information notified to the application processing unit 101 from the selection unit 102 is not limited to the setting information, but may further include information necessary for the application processing unit 101 to link to the cloud platform to be switched to.

The application processing unit 101 may manage the information necessary for the linkage by using the storage unit 121 or the like. For example, for each of the cloud platforms as the link destination, that is, for each of the cloud platform 201 and the cloud platform 202, the application processing unit 101 may hold the name of the sub-application program to be executed, setting of the sub-application program, the name of container, setting of the container, and the like.

In this manner, the application processing unit 101 connects to the cloud platform selected (switched) by the selection unit 102 by using the notified identification information and authentication information, and communicates with the connected cloud platform according to the notified permission information.

Note that the application processing unit 101 may have various kinds of communication defined in advance with some or all of the cloud platforms including the unselected cloud platform. The various kinds of communication defined in advance may be communication for transmitting the current operation status of the edge terminal 100, for example. The current operation status includes, for example, information indicating the currently connected cloud platform. Upon receiving the operation status, the cloud platform can transmit an instruction to the edge terminal 100 to switch the link destination in accordance with the operation status, for example.

Each of the above-described units (the application processing unit 101 and the selection unit 102) can be implemented by one or more hardware processors, for example. For example, each of the above-described units may be implemented by executing a computer program with a processor such as a CPU, that is, may be implemented by software. Each of the above-described units may be implemented by a processor such as a dedicated integrated circuit (IC), that is, may be implemented by hardware. Each of the above-described units may be implemented by using software and hardware in combination. In a case of using a plurality of processors, each of the processors may implement one of the units or two or more of the units.

Figure 5:
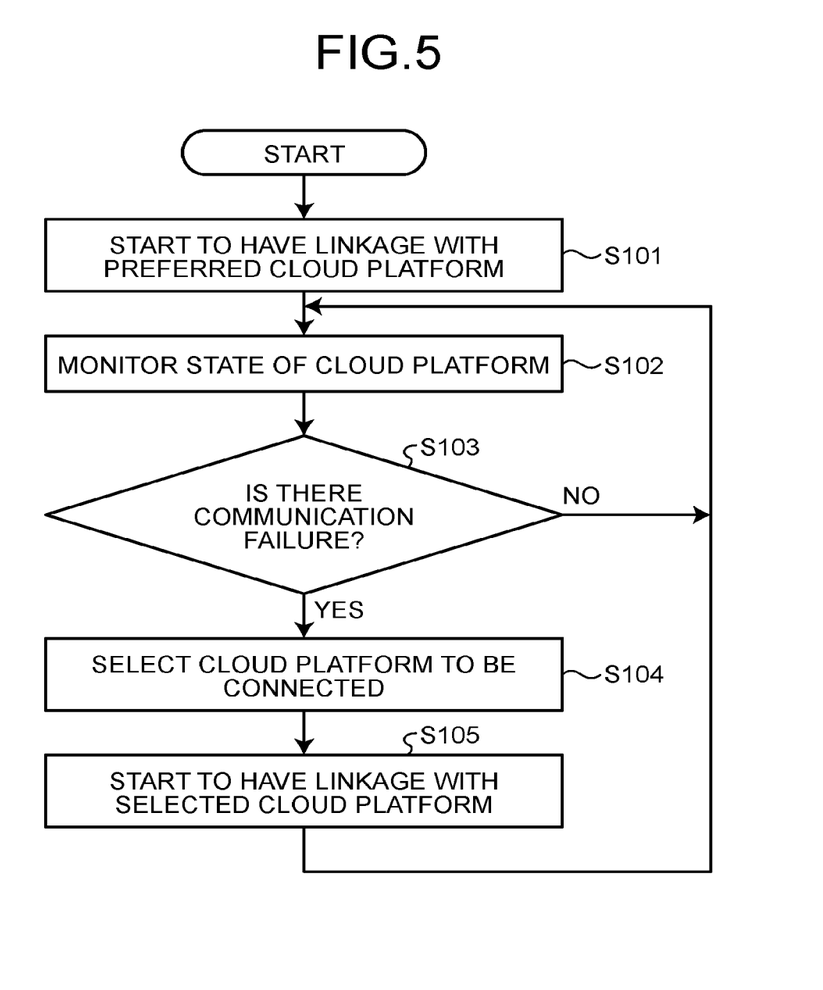
FIG. 5 is a flowchart of communication processing according to the embodiment.

Next, communication processing executed by the edge terminal 100 will be described. FIG. 5 is a flowchart illustrating an example of the communication processing according to the first embodiment.

The selection unit 102 selects the preferred cloud platform based on the priority. For example, the selection unit 102 selects the cloud platform with the highest priority. The application processing unit 101 starts to have linkage with the selected (preferred) cloud platform (step S101). The application processing unit 101 monitors the state of communication with the linked cloud platform (step S102). The application processing unit 101 determines whether there is a failure occurred in the communication with the linked cloud platform (step S103).

When there is no failure (No at step S103), the processing returns to step S102 and communication with the linked cloud platform is continued.

When there is a failure (Yes at step S103), the selection unit 102 selects the next preferred cloud platform to be connected based on the priority (step S104). The application processing unit 101 starts to have linkage with the selected cloud platform (step S105). Thereafter, the processing returns to step S102 and the communication with the cloud platform switched to be the link destination is continued.

As described above, in the first embodiment, the edge terminal 100 can switch the link destination to an alternative cloud platform when it is no longer possible to have the communication with the linked cloud platform. Therefore, it is possible to suppress outage of the service using the cloud platform and continue the application the edge terminal 100 is to execute.

Second Embodiment

In a second embodiment, an edge terminal connects to cloud platforms by different communication modes or different networks for each of the cloud platforms as the link destinations.

Figure 6:
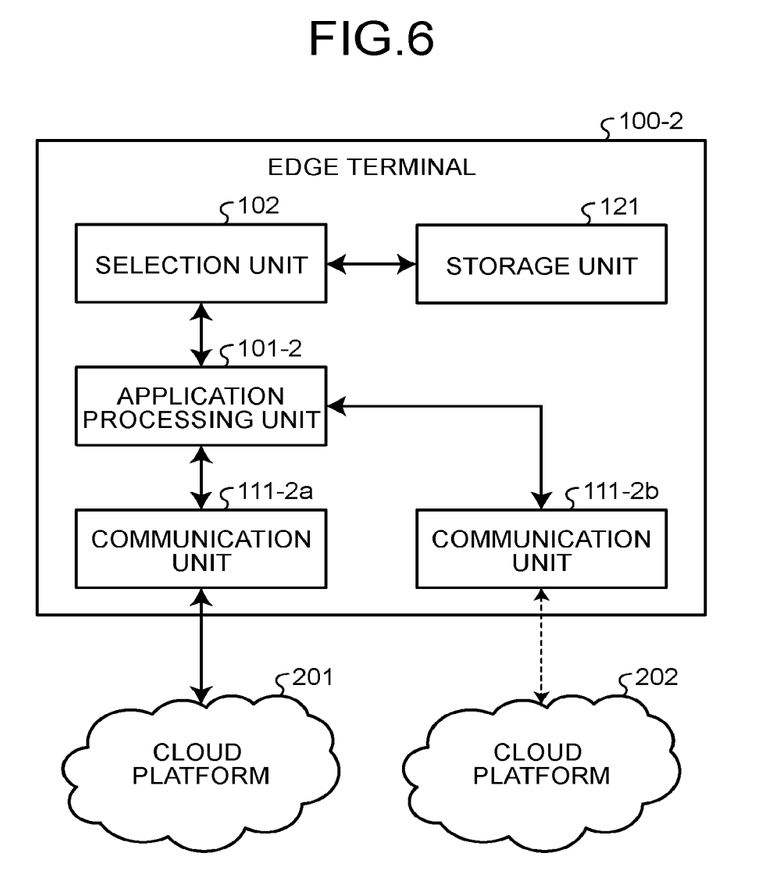
FIG. 6 is a block diagram of an edge terminal according to a second embodiment.

FIG. 6 is a block diagram illustrating an example of the configuration of an edge terminal 100-2 according to the second embodiment. As illustrated in FIG. 6, the edge terminal 100-2 includes communication units 111-2a, 111-2b, an application processing unit 101-2, a selection unit 102, and a storage unit 121.

The second embodiment is different from the first embodiment in respect that it includes a plurality of communication units 111-2a, 111-2b, and in regards to the function of the application processing unit 101-2. Other configurations and functions are the same as those illustrated in FIG. 3 that is a block diagram of the edge terminal 100 according to the first embodiment, so the same reference signs are applied and explanations are omitted herein.

The communication unit 111-2a is a communication unit used to communicate with the cloud platform 201. The communication unit 111-2b is communication unit used to communicate with the cloud platform 202.

The application processing unit 101-2 is different from the application processing unit 101 of the first embodiment in respect that it uses the communication unit 111-2a when communicating with the cloud platform 201, and uses the communication unit 111-2b when communicating with the cloud platform 202.

Errors occurred in the communication unit 111-2a and errors occurred in the communication unit 111-2b are notified to the selection unit 102 via the application processing unit 101-2. The selection unit 102 switches the cloud platform as the link destination according to the setting information stored in the storage unit 121.

Note that the edge terminal 100-2 does not always need to have both of the communication units 111-2a and 111-2b. For example, one communication unit (assumed to be the communication unit 111-2b) may be in a form of a universal serial bus (USB) dongle and may be connected to the edge terminal 100-2 as necessary. In such a case, the edge terminal 100-2 need not have the communication unit 111-2b for communicating with the cloud platform 202 in a state of being linked to the cloud platform 201.

It is assumed that there is a failure occurring in the communication between the edge terminal 100-2 and the cloud platform 201, and the selection unit 102 determines that it is necessary to switch to the cloud platform 202. In such a case, for example, it is notified to the user in the vicinity of the edge terminal 100-2 that it is necessary to switch the cloud platform by using a user interface such as a display device (monitor or the like), a voice output device (speaker or the like), or a light emitting diode (LED) connected to the edge terminal 100-2, for example.

When the user connects the communication unit 111-2b to the edge terminal 100-2 according to the notification, the application processing unit 101-2 starts to have the linkage with the cloud platform 202, and completes switching of the cloud platform 201 to the cloud platform 202.

Note that the flow of the communication processing according to the second embodiment is the same as in FIG. 5 that indicates the communication processing according to the first embodiment, so the explanation thereof is omitted.

As described above, the communication device according to the second embodiment can implement the same functions as those of the first embodiment with the configuration using a plurality of communication units.

Third Embodiment

In a third embodiment, an edge terminal connects to one or more other edge terminals and acts as a gateway for the other edge terminals. Hereafter, the other edge terminals that are accommodation target of the edge terminal acting as the gateway are referred to as child edge terminals.

Figure 7:
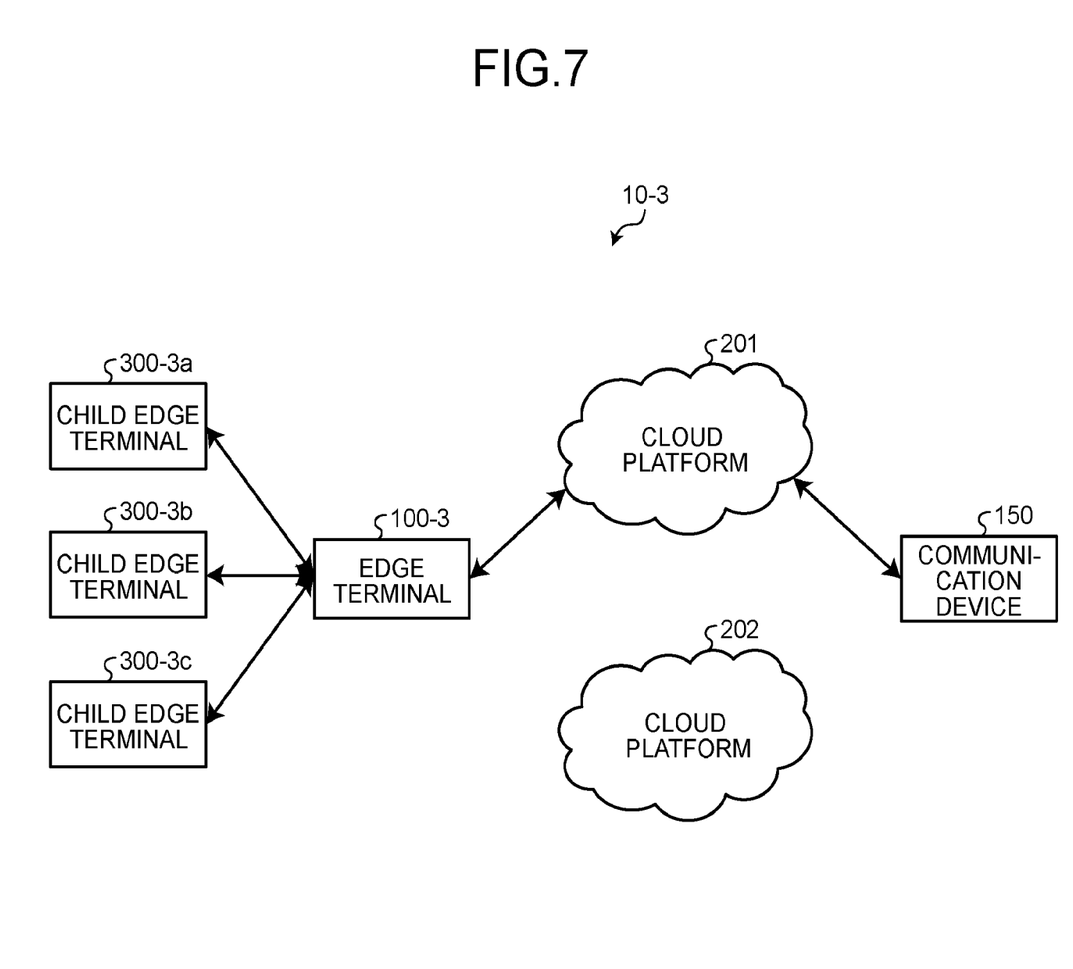
FIG. 7 is a block diagram illustrating a communication system according to a third embodiment.

FIG. 7 is a block diagram illustrating a configuration example of a communication system 10-3 according to the present embodiment. As illustrated in FIG. 7, the communication system 10-3 includes an edge terminal 100-3, child edge terminals 300-3a, 300-3b, 300-3c, a communication device 150, and cloud platforms 201, 202.

The child edge terminals 300-3a, 300-3b, and 300-3c are simply referred to as the child edge terminals 300-3 when no distinction is necessary. The number of child edge terminals 300-3 is not limited to three, but may be one, two, four, or more.

It is assumed that the child edge terminals 300-3 are not directly linkable to the cloud platforms 201 and 202. Directly linkable means that it is possible to complete the necessary security processing with the cloud platform, and to transmit and receive data without executing data conversion and the like. Since the child edge terminals 300-3 are not directly linkable, the data of the child edge terminals 300-3 is not transmittable to the cloud platforms 201, 202, and instructions from the cloud platforms to the child edge terminal 300-3 is not receivable without the mediation of the edge terminal 100-3 acting as the gateway. Note that there may be a plurality of terminals that are connected after the child edge terminal 300-3.

For example, the child edge terminals 300-3 may be a temperature sensor and devices (air conditioning, blind, lighting, and the like) that are targets of control in accordance with sensor data of the temperature sensor. The edge terminal 100-3 is a relay device for transmitting and receiving the sensor data and instructions from the cloud platforms 201 and 202.

Figure 8:
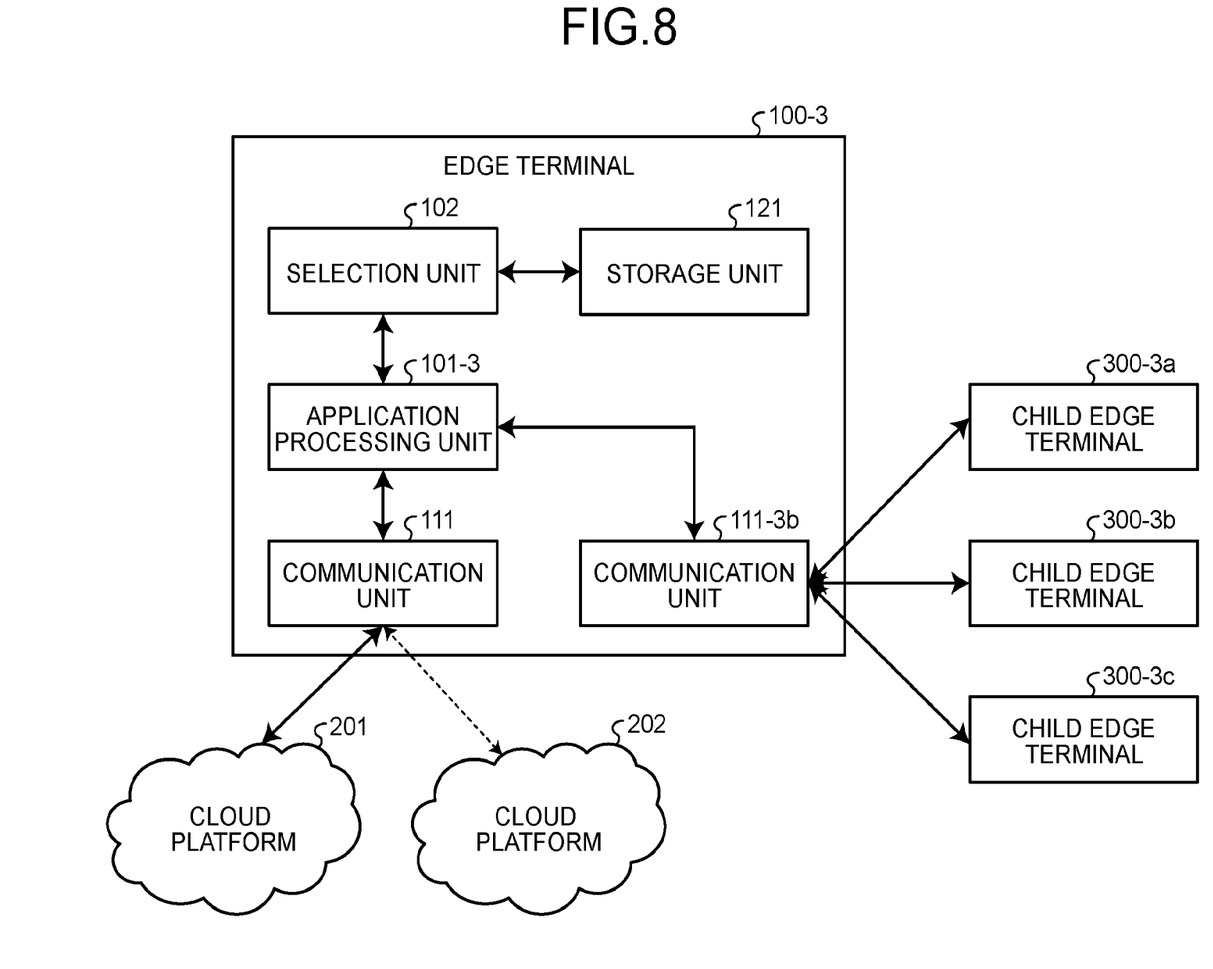
FIG. 8 is a block diagram of an edge terminal according to the third embodiment.

FIG. 8 is a block diagram illustrating an example of the configuration of the edge terminal 100-3 according to the third embodiment. As illustrated in FIG. 8, the edge terminal 100-3 includes communication units 111, 111-3b, an application processing unit 101-3, a selection unit 102, and a storage unit 121.

The third embodiment is different from the first embodiment in respect that it includes the communication unit 111-3b added thereto and in regards to the function of the application processing unit 101-3. Other configurations and functions are the same as those illustrated in FIG. 3 that is a block diagram of the edge terminal 100 according to the first embodiment, so the same reference signs are applied and explanations are omitted herein.

FIG. 8 can be interpreted as an example where the communication unit 111-3b is added, for example, to the first embodiment. It is also possible to employ a configuration where the communication unit 111-3b is added, for example, to the configuration like the second embodiment that includes a plurality of communication units.

The communication unit 111-3b is a communication unit for performing communication with the child edge terminals 300-3. The application processing unit 101-3 is different from the application processing unit 101 of the first embodiment in respect that it uses the communication unit 111 when communicating with the cloud platform 201, and uses the communication unit 111-3b when communicating with the child edge terminals 300-3.

The application processing unit 101-3 transmits the data collected from the child edge terminals 300-3, for example, to one of the cloud platforms 201 and 202 selected as the link destination by using the communication unit 111. When an instruction for the child edge terminals 300-3 is transmitted from cloud platform 201 or 202, the application processing unit 101-3 transmits the received instruction to the child edge terminals 300-3 that are the recipients of the received instruction by using the communication unit 111-3b.

Note that the flow of the communication processing according to the third embodiment is the same as in FIG. 5 that indicates the communication processing according to the first embodiment, so the explanation thereof is omitted.

As described, the third embodiment can implement the same functions as those of the first embodiment in regards to the configuration where an edge terminal acts as the gateway for the other edge terminals.

Fourth Embodiment

In a fourth embodiment, an on-premise server is included as a server as the link destination, in addition to the cloud platforms. An on-premise server is, for example, a server placed within a same local area network as the edge terminal, for example, and managed by the same management entity as the edge terminal.

Furthermore, in the present embodiment, when not linkable to any of the servers, the edge terminal is capable of switching to autonomous operation. Autonomous operation means that the edge terminal itself, instead of the server, executes application processing, such as collecting data and outputting collected data.

Figure 9:
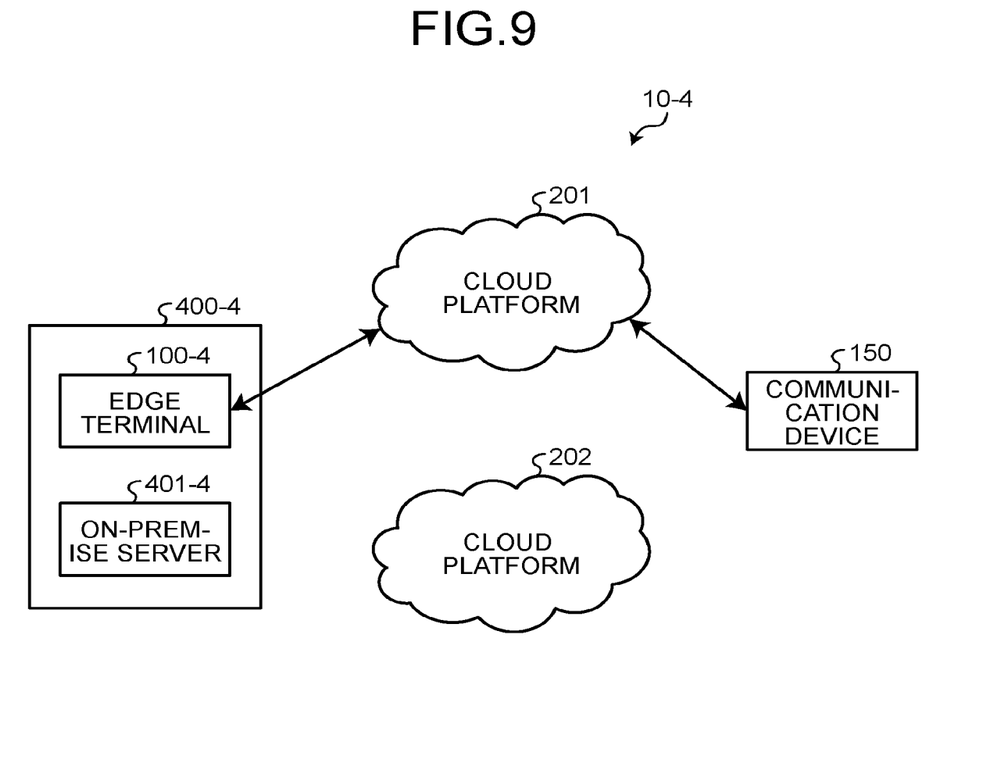
FIG. 9 is a block diagram illustrating a communication system according to a fourth embodiment.

FIG. 9 is a block diagram illustrating a configuration example of a communication system 10-4 according to the present embodiment. As illustrated in FIG. 9, the communication system 10-4 includes an edge terminal 100-4, an on-premise server 401-4, a communication device 150, and cloud platforms 201, 202.

The edge terminal 100-4 and the on-premise server 401-4 are placed within a local area network 400-4.

Like the cloud platforms 201, 202, the on-premise server 401-4 may have at least one of the user interface function and the external-linkage interface function.

Figure 10:
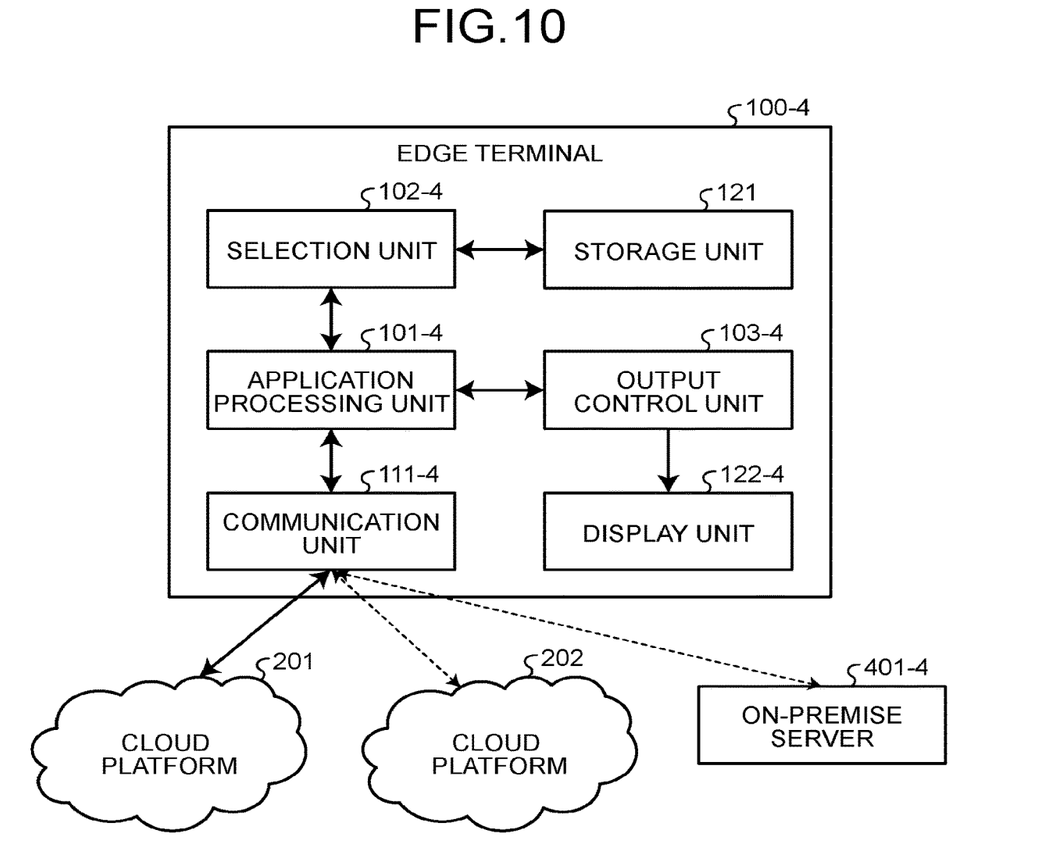
FIG. 10 is a block diagram of an edge terminal according to the fourth embodiment.

FIG. 10 is a block diagram illustrating an example of the configuration of the edge terminal 100-4 according to the fourth embodiment. As illustrated in FIG. 10, the edge terminal 100-4 includes a communication unit 111-4, an application processing unit 101-4, a selection unit 102-4, a storage unit 121, an output control unit 103-4, and a display unit 122-4.

The fourth embodiment is different from the first embodiment in regards to the functions of the communication unit 111-4, the application processing unit 101-4, and the selection unit 102-4, and in respect that the output control unit 103-4 and the display unit 122-4 are added. Other configurations and functions are the same as those illustrated in FIG. 3 that is a block diagram of the edge terminal 100 according to the first embodiment, so the same reference signs are applied and explanations are omitted herein.

Note that FIG. 10 can be interpreted as an example where the on-premise server 401-4 is added, for example, to the first embodiment. It is also possible to employ a configuration where the on-premise server 401-4 is added, for example, to the second or the third embodiment.

The communication unit 111-4 is different from the communication unit 111 of the first embodiment in respect that it also performs communication with the on-premise server 401-4.

Figure 11:
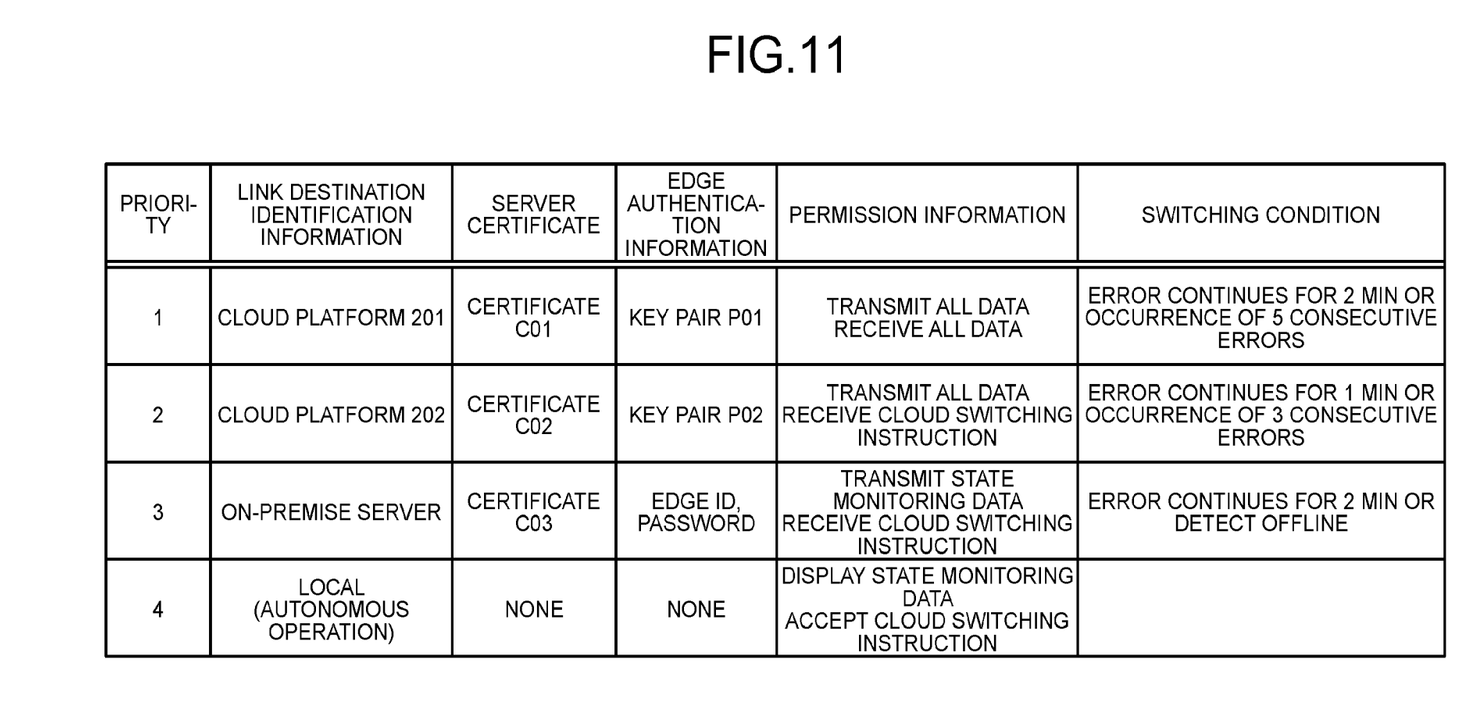
FIG. 11 is a chart illustrating an example of setting information.

The selection unit 102-4 is different from the selection unit 102 of the first embodiment in respect that it selects a link destination from a plurality of servers including the on-premise server 401-4, and that it is capable of selecting autonomous operation. FIG. 11 is a chart illustrating an example of setting information the selection unit 102-4 refers to.

In the example in FIG. 11, as the setting information with the third and fourth priorities, setting information of the on-premise server 401-4 and setting information regarding autonomous operation are added. For example, in a case of the on-premise server 401-4, the identification information (edge ID) of the edge terminal 100-4 and a password are stored as the edge authentication information.

Returning to FIG. 10, the selection unit 102-4 refers to the setting information as indicated in FIG. 11 to select the server to be the link destination and also to determine whether to switch to autonomous operation. For example, upon detecting a failure in the communication with the linked cloud platform, the selection unit 102-4 switches the link destination to the on-premise server 401-4 according to the priority. Furthermore, when the edge terminal 100-4 is unable to communicate with all of the cloud platforms and the on-premise server 401-4, the selection unit 102-4 switches to autonomous operation.

When the on-premise server 401-4 is selected, the application processing unit 101-4 executes application processing with the on-premise server 401-4. Furthermore, when autonomous operation is selected, the application processing unit 101-4 executes the application processing to switch to autonomous operation.

The display unit 122-4 is a display device such as a liquid crystal display for displaying various kinds of information.

The output control unit 103-4 controls the output of various kinds of information from the edge terminal 100-4. For example, the output control unit 103-4 controls display of the information on the display unit 122-4. The output control unit 103-4 outputs, to the display unit 122-4, output information including the status of communication with a plurality of servers (the cloud platforms 201, 202, and the on-premise server 401-4), for example. In the case of autonomous operation, the output control unit 103-4 may display a screen for selecting the server as the link destination on the display unit 122-4. This allows the user to switch from autonomous operation to a status of being linked to the server.

The output control unit 103-4 may output at least one of the output information and the screen only during autonomous operation or also during other situation than the autonomous operation.

Note that the flow of the communication processing according to the fourth embodiment is the same as in FIG. 5 that indicates the communication processing according to the first embodiment, so the explanation thereof is omitted.

As described above, in the fourth embodiment, not only the cloud platforms but also the server (on-premise server) built in a local area network, for example, can be selected as a link destination. Furthermore, when not connectable to any of the servers, it is possible to switch to autonomous operation where the edge terminal itself executes the application processing.

As described above, according to the first to fourth embodiments, it is possible to suppress outage of the service using the server.

Figure 12:
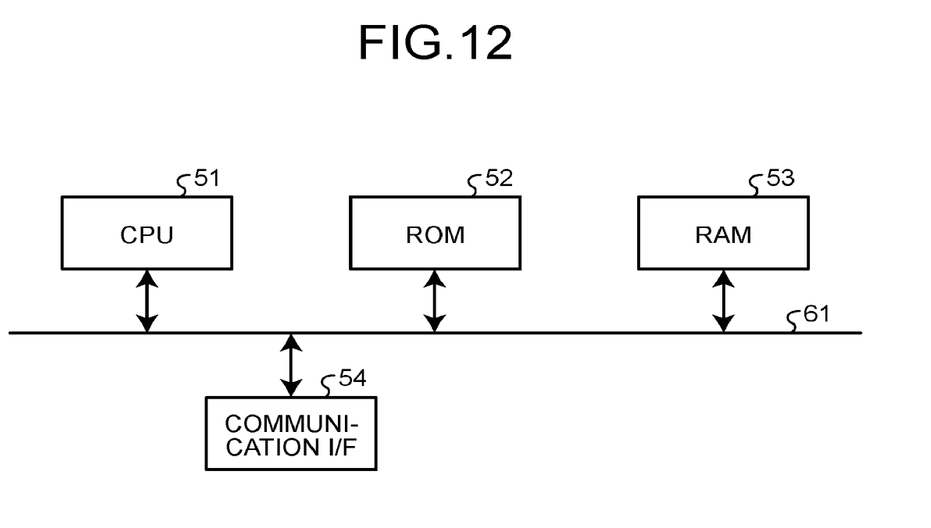
FIG. 12 is a block diagram of hardware of a communication device according to the embodiment.

Next, a hardware configuration of the communication device according to the first or fourth embodiment will be described by referring to FIG. 12. FIG. 12 is an explanatory diagram illustrating an example of the hardware configuration of the communication device according to the first or fourth embodiment.

The communication device according to the first or fourth embodiment includes a control device such as a CPU 51, storage devices such as a read-only memory (ROM) 52 and a RAM 53, a communication I/F 54 for performing communication by connecting to a network, and a bus 61 that connects each of the units.

A computer program executed by the communication device according to the first or fourth embodiment is provided by being loaded in advance on the ROM 52 or the like.

The computer program executed by the communication device according to the first or fourth embodiment may be configured to be provided as a computer program product in a file of an installable form or an executable form by being recorded on a computer-readable recording medium, such as a compact disc read-only memory (CD-ROM), a flexible disk (FD), a compact disc recordable (CD-R), or a digital versatile disc (DVD).

Furthermore, the computer program executed by the communication device according to the first or fourth embodiment may be provided by being stored on a computer that is connected to a network such as the Internet and downloaded via the network. Furthermore, the computer program executed by the communication device according to the first or fourth embodiment may be provided or distributed via a network such as the Internet.

The computer program executed by the communication device according to the first or fourth embodiment may cause a computer to function as each of the units of the communication device described above. The computer enables the CPU 51 to load the computer program on a main memory from the computer readable storage medium, so as to execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
storage that stores therein, for each of a plurality of servers, setting information including identification information of a server, authentication information used for connecting to the server, permission information indicating permitted communication with the server, and a priority, wherein one or more functions provided by each of the plurality of servers include a common function that is common to the plurality of servers; and
one or more hardware processors communicably coupled to the storage and configured to:
  select, based on the priority, a first server that is one of the servers;
  connect the communication device to the first server based on identification information and authentication information of the first server,
  perform, according to the permission information for the first server, communication with the first server that is connected,
  select a second server other than the first server from the servers when a failure is detected in communication with the first server,
  connect the communication device to the second server based on identification information and authentication information of the second server, and
  perform, according to the permission information for the second server, communication with the second server that is connected.

2. The communication device according to claim 1, wherein
the setting information further includes a condition for detecting a failure in communication, and
the one or more hardware processors select the second server when the condition included in the setting information of the first server is satisfied.

3. The communication device according to claim 1, wherein
the one or more hardware processors
  select the first server, upon receiving an instruction to switch from the second server to the first server, and
  perform, according to the permission information for the first server, communication with the first server that is connected based on the identification information and the authentication information of the first server.

4. The communication device according to claim 1, wherein the one or more hardware processors: perform a predetermined type of communication with some or all of the servers; and performs communication according to the permission information only with the first server.

5. The communication device according to claim 1, wherein the servers include an on-premise server that is managed by a same management entity as the communication device.

6. The communication device according to claim 1, wherein
the one or more hardware processors are configured to control processing for outputting output information including a status of communication with the servers.

7. The communication device according to claim 1, wherein
the setting information further includes: permission information indicating a function that is permitted when the communication device, instead of the servers, executes application processing; and a priority,
the one or more hardware processors
further select execution of the application processing by the communication device based on the priority, and
execute the application processing when the execution of the application processing is selected.

8. A communication method executed by a computer of a communication device, the communication method comprising:
selecting a first server that is one of a plurality of servers based on a priority stored in a storage that stores, for each of the servers, setting information including identification information of the server, authentication information used for connecting to the server, permission information indicating permitted communication with the server, and the priority, wherein one or more functions provided by each of the plurality of servers include a common function that is common to the plurality of servers;
connecting the communication device to the first server based on identification information and authentication information of the first server;
performing, according to the permission information for the first server, communication with the first server that is connected
selecting a second server other than the first server from the servers when a failure is detected in communication with the first server;
connecting the communication device to the second server based on identification information and authentication information of the second server; and
performing, according to the permission information for the second server, communication with the second server that is connected.

9. A computer program product having a non-transitory computer readable medium including programmed instructions, wherein the instructions, when executed by a computer, cause the computer to perform:
selecting a first server that is one of a plurality of servers based on a priority stored in storage that stores, for each of the servers, setting information including identification information of the server, authentication information used for connecting to the server, permission information indicating permitted communication with the server, and the priority, wherein one or more functions provided by each of the plurality of servers include a common function that is common to the plurality of servers;
connecting a communication device to the first server based on identification information and authentication information of the first server;
performing, according to the permission information for the first server, communication with the first server that is connected
selecting a second server other than the first server from the servers when a failure is detected in communication with the first server;
connecting the communication device to the second server based on identification information and authentication information of the second server; and
performing, according to the permission information for the second server, communication with the second server that is connected.

10. The communication device according to claim 1, wherein
multiple pieces of identification information each of which corresponds to one of the plurality of servers, are mutually different, and
multiple pieces of authentication information each of which corresponds to one of the plurality of servers, are mutually different.

11. The communication device according to claim 1, wherein
the second server provides more limited functions than the first server.

12. The communication device according to claim 1, wherein
the one or more hardware processors
transmit a current operation status of the communication device to part or all of the plurality of servers.

* * * * *